United States Patent [19]
Bereuter et al.

[11] Patent Number: 6,040,281
[45] Date of Patent: Mar. 21, 2000

[54] USE ALKALI AND/OR TRIETHANOLAMINE SALTS OF THE ALKANOYLAMIDOCARBOXYLIC ACIDS IN METAL WORKING

[75] Inventors: Heinz Bereuter; Thomas Bereuter, both of Hard; Wolfgang Bereuter, Salzburg; Ingrid Kohlhaupt, Hard, all of Austria

[73] Assignee: Heinz Bereuter, Australia

[21] Appl. No.: 09/101,253

[22] PCT Filed: Dec. 24, 1996

[86] PCT No.: PCT/EP96/05837

§ 371 Date: Jul. 5, 1998

§ 102(e) Date: Jul. 5, 1998

[87] PCT Pub. No.: WO97/25394

PCT Pub. Date: Jul. 17, 1997

[30] Foreign Application Priority Data

Jan. 4, 1996 [AT] Austria .......................................... 10/96

[51] Int. Cl.[7] .................................................. C10M 133/06
[52] U.S. Cl. .......................... 508/508; 508/515; 554/56; 554/57; 554/58; 554/59; 72/42
[58] Field of Search ................................................ 508/508

[56] References Cited

U.S. PATENT DOCUMENTS

| 4,144,182 | 3/1979 | Bereuter | 508/508 |
|---|---|---|---|
| 5,254,277 | 10/1993 | Gentit et al. | 508/508 |
| 5,401,428 | 3/1995 | Kalota et al. | 508/508 |

*Primary Examiner*—Ellen M. McAvoy

[57] ABSTRACT

At least 5, preferably at least 30, in particular about 50, percent by weight of the alkali metal salts and/or triethanolamine salts of alkanoylamidocarboxylic acids of the general formula

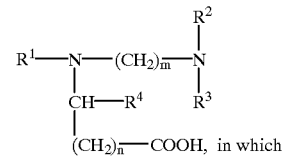

(A)

$R^1$ denotes an alkanoyl or an alkanesulfonyl radical, each having 6 to 20 carbon atoms,

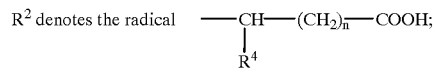

$R^2$ denotes the radical

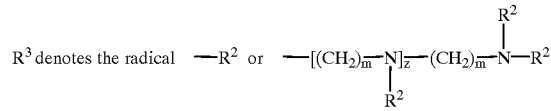

$R^3$ denotes the radical $R^4$ denotes a hydrogen atom;

m is 2;

n is 0 or 1, and z denotes an integer from 0 to 3;

are used as antifoams in corrosion-inhibiting metal working compositions.

6 Claims, No Drawings

USE ALKALI AND/OR TRIETHANOLAMINE SALTS OF THE ALKANOYLAMIDOCARBOXYLIC ACIDS IN METAL WORKING

The invention relates to alkali metal salts and triethanolamine salts of alkanoylamidocarboxylic acids, as have been disclosed as metal working compositions in AT 344 854 B. According to said publication, such salts have been used to date as corrosion-inhibiting coolants and metal working compositions. Most salts stated there gave good to very good corrosion protection in the machining of the workpieces. However, they exhibit undesirably strong foaming in modern high-speed metal working centres, owing to the large cooling lubricant circulation and the high delivery pressure. The addition of commercial antifoams results in only a partial improvement and in particular only briefly, and on the other hand occasionally gives rise to undesired side effects.

It is therefore the object of the invention to select those salts which exhibit a continuously low level of foaming behaviour which meets the requirements of modern NC machines. This is achieved in a surprising manner by alkali metal salts and/or triethanolamine salts of alkanoylamidocarboxylic acids of the general formula (A)

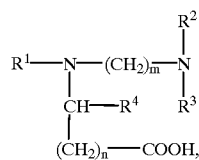

in which $R^1$ denotes an alkanoyl or an alkanesulfonyl radical, each having 6 to 20 carbon atoms;

$R^2$ denotes the radical

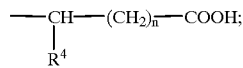

$R^3$ denotes the radical $R^2$ or

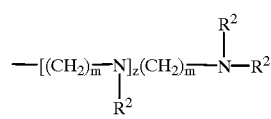

$R^4$ denotes a hydrogen atom or an alkane radical having 1 to 3 carbon atoms;

m is 2 n is 0 or 1, and z denotes an integer form 0–3 in an amount of at least 5, preferably at least 30, in particular 50, percent by weight of the concentrate of corrosion-inhibiting metal working compositions in aqueous solution, as antifoams.

They include virtually exclusively salts of monoalkanoylethylenediaminetriacetic or monoalkanoylethylenediaminetripropionic acids, monoalkanoyldiethylenetriaminetetraacetic or monoalkanoyldiethylenetriaminetetrapropionic acids, monoalkanoyltriethylenetetraminepentaacetic or monoalkanoyltriethylenetetraminepentapropionic acids or monoalkanoyltetraethylenepentaminehexaacetic or monoalkanoyltetraethylenepentaminehexapropionic acids, i.e.:

1. N-caproylethylenediamine-N,N',N'-triacetic acid
2. N-caproylethylenediamine-N,N',N'-tripropionic acid
3. N-isooctanoylethylenediamine-N,N',N'-triacetic acid
4. N-isooctanoylethylenediamine-N,N',N'-tripropionic acid
5. N-isononanoylethylenediamine-N,N',N'-triacetic acid
6. N-isononanoylethylenediamine-N,N',N'-tripropionic acid
7. N-isononanoyldiethylenetriamine-N,N',N",N"-tetraacetic acid
8. N-isononanoyldiethylenetriamine-N,N',N",N"-tetrapropionic acid
9. N-decanoylethylenediamine-N,N',N'-triacetic acid
10. N-decanoylethylenediamine-N,N',N'-tripropionic acid
11. N-undecanoylethylenediamine-N,N',N'-triacetic acid
12. N-undecanoylethylenediamine-N,N',N'-tripropionic acid In 2% aqueous solution, salts of these acids give such low-foam cooling lubricants that they no longer give rise to any troublesome foam development even with the largest cooling lubricant circulation and delivery pressures up to 20 bar.

The foam behaviour of the above-mentioned compounds was now tested by the perforated-disc beating method according to DIN 53902, Part 1, compounds of the Austrian Patent mentioned at the outset, namely the triethanolamine salts of N,N'-diisononanoylethylenediamine-N,N'-diacetic acid (A) or of N,N'-diisononanoylethylenediamine-N,N'-dipropionic acid (B), exhibiting very disadvantageous foaming behaviour.

TABLE 1

| Triethanol-amine salt of compound No. | Concentration (in % by weight) | Foam height (in mm) immediately after beating | Foam height (in mm) after 10 sec | Foam height (in mm) after 20 sec | Foam height (in mm) after 30 sec |
|---|---|---|---|---|---|
| Blank sample | distilled water | 10 | 0 | 0 | 0 |
| A | 2% | 100 | 70 | 58 | 40 |
| B | 2% | 105 | 72 | 60 | 41 |
| 1 | 2% | 13 | 2 | 0 | 0 |
| 2 | 2% | 15 | 1 | 0 | 0 |
| 3 | 2% | 15 | 2 | 0 | 0 |
| 4 | 2% | 15 | 1 | 0 | 0 |
| 5 | 2% | 15 | 2 | 0 | 0 |

TABLE 1-continued

| Triethanol-amine salt of compound No. | Concentration (in % by weight) | Foam height (in mm) immediately after beating | Foam height (in mm) after 10 sec | Foam height (in mm) after 20 sec | Foam height (in mm) after 30 sec |
|---|---|---|---|---|---|
| 6 | 2% | 15 | 2 | 0 | 0 |
| 7 | 2% | 12 | 0 | 0 | 0 |
| 8 | 2% | 13 | 0 | 0 | 0 |
| 9 | 2% | 16 | 3 | 0 | 0 |
| 10 | 2% | 16 | 2 | 0 | 0 |
| 11 | 2% | 17 | 4 | 0 | 0 |
| 12 | 2% | 17 | 4 | 0 | 0 |

As shown in Table 1, for example A gave a foam height of 100 mm immediately after beating, which was still 70 mm after 10 sec, 58 mm after 20 sec and declined to 7 mm only after 180 sec. In contrast, the compounds according to the invention exhibited a substantially more advantageous foam behaviour.

Interestingly, the foam effect of other salts, in particular of those salts protected in the Austrian Patent mentioned at the outset, but also of those other, conventional, water-miscible cooling lubricants and metal working compositions, for example also of oil emulsions, is greatly reduced merely by adding small amounts of only 5 to 40, preferably 10 to 30, % by weight of the compounds according to the invention. With additions of 50% or more, the foam effect is already virtually just as small as in the case of the pure substances according to the invention.

The foam behaviour of mixtures of the triethanolamine salts of the acids according to the invention with other cooling lubricants, such as, for example, A or B from the AT-patent mentioned at the outset, or with Syntelo® (from Castrol) or a mineral oil emulsion Mobilmet® 151 (containing phosphoric esters and alkanolamine esters of boric acid), is shown in Table 2 below.

selecting at least one of alkali metal salts and triethanolamine salts of alkanoylamidocarboxylic acids of a general formula

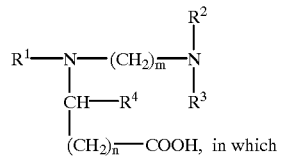

(A)

$R^1$ denoted an alkanoyl or an alkanesulfonyl radical, each having 6 to 20 carbon atoms, $R^2$ denotes the radical

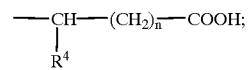

TABLE 2

| Triethanol-amine salts of compound No. as a mixture with in the ratio | Concentration (% by weight) | Foam height (in mm) after beating: | | | | | | |
|---|---|---|---|---|---|---|---|---|
| | | Immediately after beating | after 10 sec | after 20 sec | after 30 sec | after 60 sec | after 120 sec | after 180 sec |
| for comp.:A | 2% | 100 | 70 | 58 | 40 | 26 | 12 | 7 |
| for comp.:B | 2% | 105 | 72 | 60 | 41 | 26 | 13 | 8 |
| No. 6:A = 30:70 | 2 | 50 | 40 | 22 | 15 | 4 | 0 | 0 |
| No. 6:A = 50:50 | 2 | 15 | 10 | 5 | 0 | 0 | 0 | 0 |
| No. 6:A = 60:40 | 2 | 15 | 7 | 0 | 0 | 0 | 0 | 0 |
| No. 7:B = 30:70 | 2 | 40 | 28 | 16 | 7 | 0 | 0 | 0 |
| No. 7:B = 50:50 | 2 | 15 | 10 | 0 | 0 | 0 | 0 | 0 |
| No. 7:B = 60:40 | 2 | 13 | 3 | 0 | 0 | 0 | 0 | 0 |
| | | immediately after beating | after 60 sec | after 120 sec | after 180 sec | after 4 min | after 8 min | after 15 min |
| C (Mobilmet ®) | 3 | 250 | 200 | 180 | 150 | 120 | 50 | 10 |
| No. 6:C = 17:83 | 3.6 | 170 | 120 | 100 | 80 | 30 | 6 | 0 |
| No. 6:C = 25:75 | 4 | 120 | 85 | 40 | 18 | 0 | 0 | 0 |
| No. 6:C = 33:67 | 4.5 | 100 | 65 | 22 | 7 | 0 | 0 | 0 |
| No. 7:C = 17:83 | 3.6 | 160 | 100 | 90 | 70 | 20 | 0 | 0 |
| No. 7:C = 25:75 | 4 | 110 | 70 | 40 | 15 | 0 | 0 | 0 |
| No. 7:C = 33:67 | 4.5 | 100 | 48 | 12 | 0 | 0 | 0 | 0 |

We claim:

1. A method to reduce foaming of corrosion-inhibiting metal working compositions, comprising the steps of $R^3$ denotes the radical $-R^2$ or

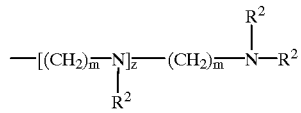

$R^4$ denotes a hydrogen atom;

m is 2 n is 0 or 1 z denotes an integer form 0 to 3, and adding an amount of at least 5 percent by weight to a concentrate of said corrosion-inhibiting metal working compositions in aqueous solution, as antifoams.

2. The method according to claim 1, characterized in that salts of monoalkanoylethylenediaminetriacetic or monoalkanoylethylenediaminetripropionic acids, monoalkanoyldiethylenetriaminetetraacetic or monoalkanoyldiethylenetriaminetetrapropionic acids, monoalkanoyltriethylenetetraminepentaacetic or monoalkanoyltriethylenetetraminepentapropionic acids or monoalkanoyltetraethylenepentaminehexaacetic or monoalkanoyltetraethylenepentaminehexapropionic acids, in particular of one of the following acids, are used:

N-caproylethylenediamine-N,N',N'-triacetic acid
N-caproylethylenediamine-N,N',N'-tripropionic acid
N-isooctanoylethylenediamine-N,N',N'-triacetic acid
N-isooctanoylethylenediamine-N,N',N'-tripropionic acid
N-isononanoylethylenediamine-N,N',N'-triacetic acid
N-isononanoylethylenediamine-N,N',N'-tripropionic acid
N-isononanoyldiethylenetriamine-N,N',N'',N''-tetraacetic acid
N-isononanoyldiethylenetriamine-N,N',N'',N''-tetrapropionic acid
N-decanoylethylenediamine-N,N',N'-triacetic acid
N-decanoylethylenediamine-N,N',N'-tripropionic acid
N-undecanoylethylenediamine-N,N',N'-triacetic acid
N-undecanoylethylenediamine-N,N',N'-tripropionic acid.

3. Water-miscible, mineral oil-containing cooling lubricants and metal working compositions, containing 5 to 40 percent by weight of at least one of alkali metal salts and triethanolamine salts of alkanoylamidocarboxylic acid of a general formula

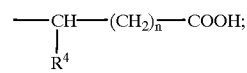

$R^1$ denoted an alkanoyl or an alkanesulfonyl radical, each having 6 to 20 carbon atoms, $R^2$ denotes the radical (A)

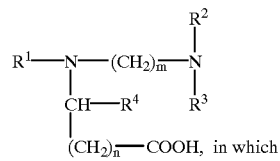

$R^3$ denotes the radical $-R^2$ or

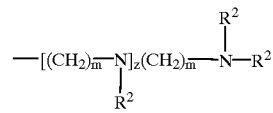

$R^4$ denotes a hydrogen atom;

m is 2 n is 0 or 1 z denotes an integer form 0 to 3 in an amount of at least 5 percent by weight of a concentrate of corrosion-inhibiting metal working compositions in aqueous solution, as antifoams.

4. The method according to claim 1, wherein said antifoams are added in an amount of at least 30 percent by weight of a concentrate of corrosion-inhibiting metal working compositions in aqueous solution.

5. The method according to claim 1, wherein said antifoams are added in an amount of at least 50 percent by weight of the concentrate of corrosion-inhibiting metal working compositions in aqueous solution.

6. The water-miscible, mineral oil-containing cooling lubricants and metal working compositions according to claim 3, containing 10 to 30 percent by weight of said salts.

* * * * *